(12) United States Patent
Ito et al.

(10) Patent No.: US 7,612,525 B2
(45) Date of Patent: Nov. 3, 2009

(54) ELECTRICAL APPARATUS

(75) Inventors: Masatoshi Ito, Yokohama (JP); Hiroshi Miyazaki, Hikone (JP); Toshiharu Ohashi, Maibara (JP); Akira Kawai, Hikone (JP)

(73) Assignee: Matsushita Electric Works, Ltd., Osaka (JP)

( * ) Notice: Subject to any disclaimer, the term of this patent is extended or adjusted under 35 U.S.C. 154(b) by 353 days.

(21) Appl. No.: 11/389,211

(22) Filed: Mar. 27, 2006

(65) Prior Publication Data

US 2006/0214627 A1    Sep. 28, 2006

(30) Foreign Application Priority Data

Mar. 28, 2005    (JP)    ............... 2005-092019

(51) Int. Cl.
*H02J 7/00*    (2006.01)

(52) U.S. Cl. .................. 320/106; 320/107; 320/136

(58) Field of Classification Search ................ 320/106, 320/110, 128, 133, 134, 135, 136, 114, 155, 320/157, 158, 159; 307/66, 82, 125; 347/109; 399/85, 88; 340/635, 636.1, 636.12, 636.16
See application file for complete search history.

(56) References Cited

U.S. PATENT DOCUMENTS

| | | | |
|---|---|---|---|
| 5,477,124 A | | 12/1995 | Tamai |
| 5,637,980 A * | | 6/1997 | Wu ........................... 320/128 |
| 6,169,341 B1 * | | 1/2001 | Nagai .......................... 307/82 |
| 6,265,849 B1 * | | 7/2001 | Ricordel ..................... 320/132 |
| 6,414,466 B1 * | | 7/2002 | Ida .............................. 320/132 |
| 6,577,104 B2 * | | 6/2003 | Sakakibara ................. 320/132 |
| 6,724,175 B1 * | | 4/2004 | Matsuda et al. ............. 323/283 |
| 6,924,624 B2 | | 8/2005 | Baur et al. |
| 6,978,098 B2 * | | 12/2005 | Nakaya ........................ 399/88 |
| 7,091,699 B2 | | 8/2006 | Mori et al. |
| 2002/0021110 A1 * | | 2/2002 | Nakagawa et al. .......... 320/136 |
| 2003/0096158 A1 | | 5/2003 | Takano et al. |
| 2003/0146736 A1 * | | 8/2003 | Kosuda et al. .............. 320/132 |
| 2004/0150704 A1 * | | 8/2004 | Horigome ................... 347/109 |

FOREIGN PATENT DOCUMENTS

| | | |
|---|---|---|
| EP | 1 251 618 A2 | 10/2002 |
| JP | 08-083627 | 3/1996 |
| JP | 2000-173668 | 6/2000 |

(Continued)

*Primary Examiner*—Edward Tso
*Assistant Examiner*—M'Baye Diao
(74) *Attorney, Agent, or Firm*—Bacon & Thomas, PLLC

(57) ABSTRACT

An electrical apparatus includes an electrical apparatus main body and a battery pack. The electrical apparatus main body has a load, a manipulation switch, a power receiving electrode, a main body control unit for controlling the electric power supplied from the power receiving electrode in response to a manipulation of the manipulation switch, a signal generation unit for generating an on-manipulation signal if the manipulation switch is switched on, and a main body signal electrode for outputting the on-manipulation signal. The battery pack has a battery, a power supplying electrode, a battery control unit for controlling the electric power supplied from the battery to the power supplying electrode, a battery signal electrode for receiving the on-manipulation signal, and a power supplying unit for starting a power supply from the battery to the battery control unit when the battery signal electrode receives the on-manipulation signal.

12 Claims, 9 Drawing Sheets

FOREIGN PATENT DOCUMENTS

| | | |
|---|---|---|
| JP | 2002-315198 | 10/2002 |
| JP | 2003-164066 | 6/2003 |
| JP | 2003-264008 | 9/2003 |
| JP | 2004-312789 | 11/2004 |
| JP | 2005-1039 | 1/2005 |

\* cited by examiner

ELECTRICAL APPARATUS

FIELD OF THE INVENTION

The present invention relates to an electrical apparatus in which an electric power gets supplied to a circuit in a battery pack by manipulating an operation switch for operating a load of a main body of the electrical apparatus.

BACKGROUND OF THE INVENTION

Recently, electrical apparatuses such as a rechargeable power tool, in which an electric power is supplied from a secondary battery in a battery pack to a motor, are widely used. Such a rechargeable electrical apparatus using a secondary battery includes an apparatus main body such as an power tool main body; and a battery pack, installed in the apparatus main body, having a secondary battery for supplying an electric power to drive the apparatus main body. Conventionally, the secondary battery in the battery pack has a plurality of battery cells, i.e., unit cells, serially connected to one another, and a voltage of each battery cell is monitored. Thus, when at least one battery cell has a voltage lower than a preset voltage level, or at least one voltage difference between the battery cells is greater than a preset voltage difference level, a protection process is executed for, e.g., preventing the use of the secondary battery (see, for example, Japanese Laid-Open Application No. H10-27630).

However, in the conventional battery-driven electrical apparatus described above, since the voltages of the respective battery cells in the secondary battery have to be constantly monitored and a protection circuit for executing the protection process has to be kept activated, an idling current needs to flow in the protection circuit even while the electrical apparatus is not in operation. Thus, even while the apparatus main body is not in operation, a power has to be constantly consumed, though in a very small amount. Therefore, the electric charge in the secondary battery is kept being dissipated, which may even lead to a complete discharge in the secondary battery for a certain type of the secondary battery to thereby deteriorate the performance of the secondary battery, e.g., due to a decrease in the number of recharging cycles or make the apparatus main body unavailable even when it is needed to be operated.

SUMMARY OF THE INVENTION

It is, therefore, an object of the present invention to provide an electrical apparatus in which a performance of a secondary battery can be protected from being deteriorated, compared to the prior art.

In accordance with the present invention, there is provided an electrical apparatus including an electrical apparatus main body having a load, a manipulation switch for operating the load, a power receiving electrode for receiving an electric power, a main body control unit for controlling the electric power supplied from the power receiving electrode to the load in response to a manipulation of the manipulation switch, a signal generation unit for generating an on-manipulation signal to indicate that the manipulation switch is switched on if the manipulation switch is switched on, and a main body signal electrode for outputting the on-manipulation signal generated by the signal generation unit; and a battery pack having a battery, a power supplying electrode for supplying an electric power from the battery to the power receiving electrode, a battery control unit for controlling the electric power supplied from the battery to the power supplying electrode to suppress a performance deterioration of the battery, a battery signal electrode for receiving the on-manipulation signal from the main body signal electrode, and a power supplying unit for starting a power supply from the battery to the battery control unit when the battery signal electrode receives the on-manipulation signal.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENTS

Figure 1:
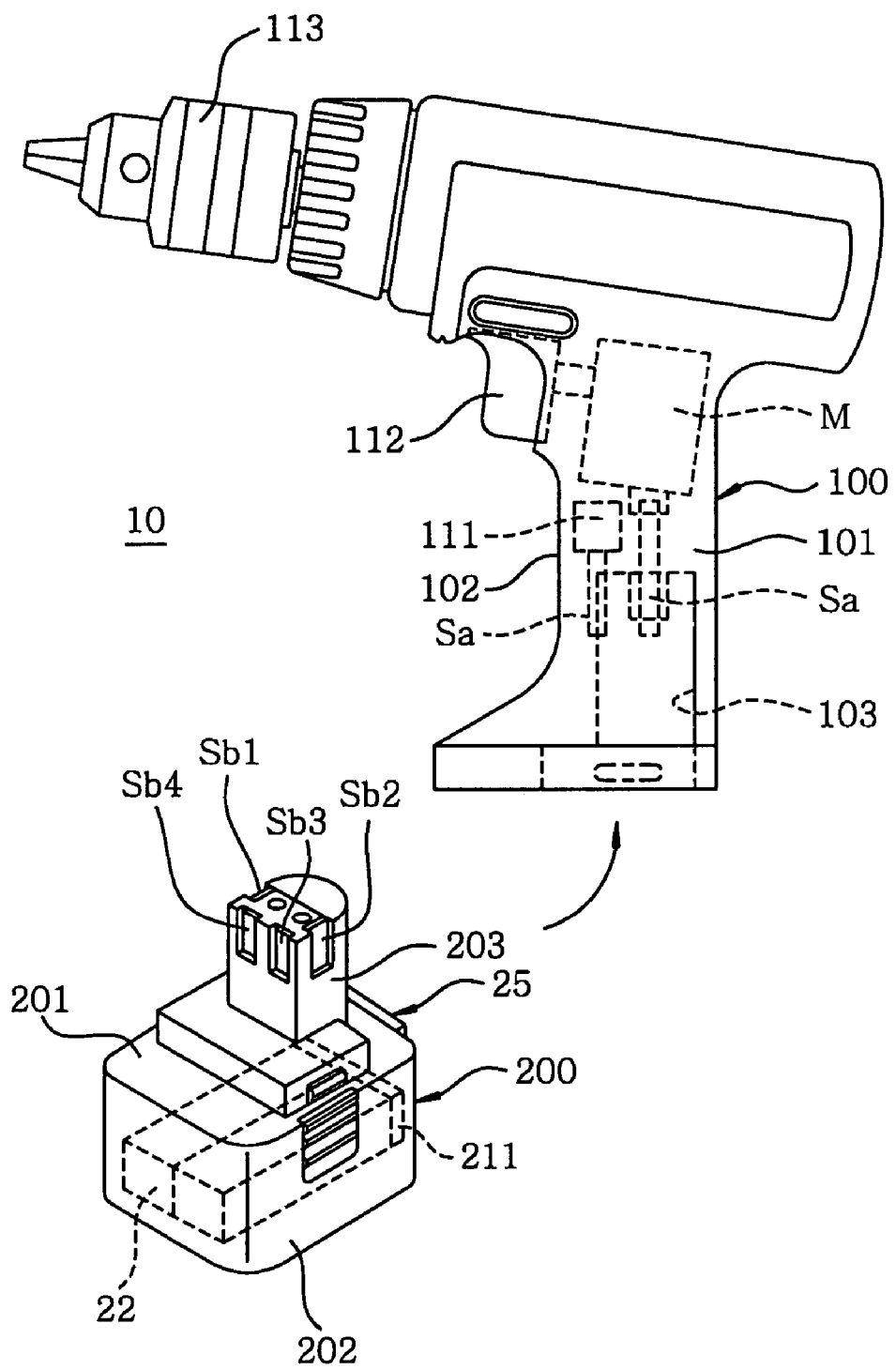
FIG. 1 shows an external configuration of main parts of a rechargeable power tool in accordance with a preferred embodiment of the present invention.

In the following, a preferred embodiment in accordance with the present invention will be described with reference to accompanying drawings. In addition, same reference numerals designate same configurations, and the description thereof will not be repeated.

Configuration of Preferred Embodiments

Electrical apparatuses including an apparatus main body having a load and a battery pack having a battery for supplying an electric power to the load of the apparatus main body are exemplified by a laptop personal computer, a camera video recorder, a digital camera, an electric razor, an electric tooth brush, and so forth. However, hereinafter will be described a preferred embodiment where the present invention is applied to an power tool.

More specifically, the present invention can be applied to such secondary batteries as a lithium-ion secondary battery, whose performance cannot be recovered once deteriorated by being overdischarged and then completely discharged, and a battery pack having a battery control unit embedded therein for controlling the discharge of the secondary battery to suppress the deterioration of the performance of the secondary battery.

Figure 2:
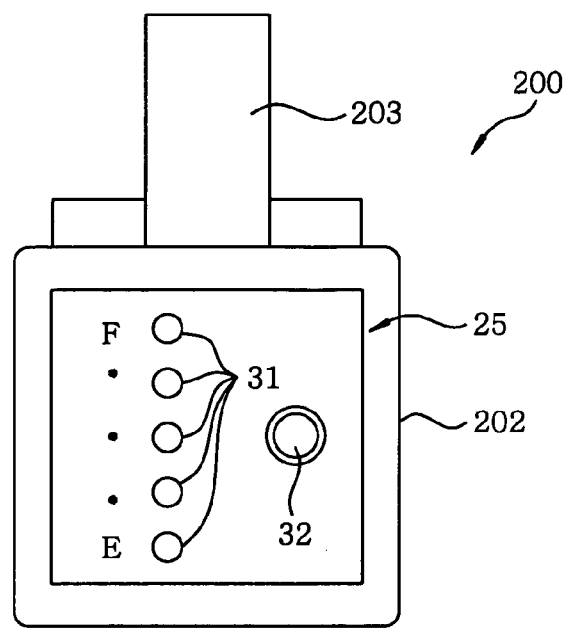
FIG. 2 illustrates a remaining charge indication unit in a battery pack in accordance with the preferred embodiment of the present invention.
Figure 3:
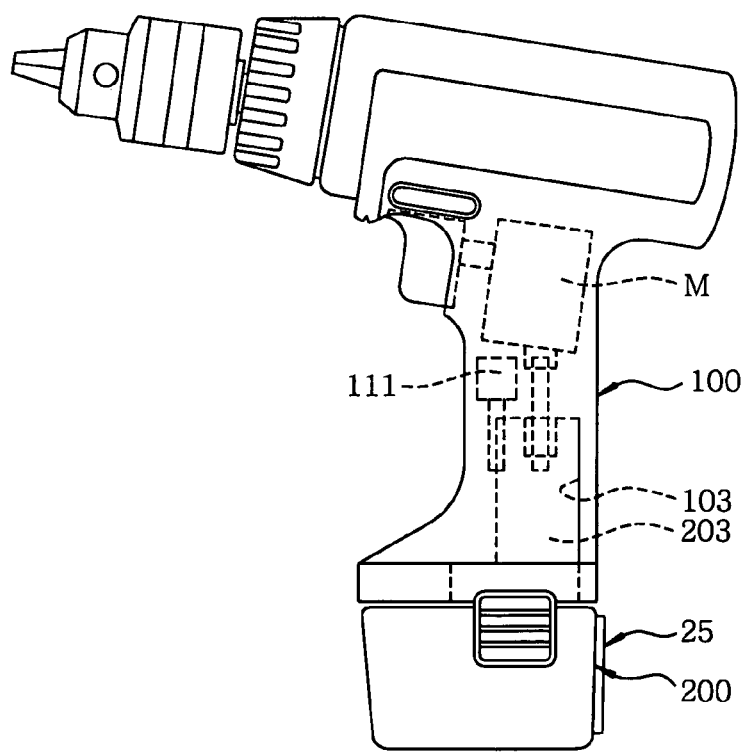
FIG. 3 depicts a tool main body in a state where the battery pack is attached thereto in accordance with the preferred embodiment of the present invention.

FIG. 1 shows an external configuration of main parts of a rechargeable power tool in accordance with the preferred embodiment of the present invention. Further, FIG. 2 illustrates a remaining charge indication unit in a battery pack. In addition, FIG. 3 depicts a tool main body in a state where the battery pack is attached thereto.

As shown in FIG. 1, a rechargeable power tool 10 includes a tool main body 100 included in, for example, a rechargeable drill driver; and a battery pack 200 to be attached to the tool main body 100.

The tool main body 100 includes a housing body 101 having a holding portion 102; a recess portion 103 formed in the holding portion 102, into which the battery pack 200 is inserted to be attached removably; a motor M which is an exemplary load installed in the housing body 101 to be driven by the battery pack 200 supplying an electric power thereto; a trigger switch 112 which is an exemplary operation switch installed at the holding portion 102 to control the supply of the electric power to the motor M to be on or off; a main body control circuit unit 111 driven by a manipulation of the trigger switch 112; a rotation unit 113 provided at a leading end of the housing body 101 to be rotated by the motor M for attaching drill bits thereto.

The battery pack 200 includes a main portion 202 having a housing body 201 in which a secondary battery 22 such as a lithium-ion secondary battery formed by serially connecting a plurality of battery cells Ce1 to Cen and a battery control circuit unit 211 for controlling a discharge of the secondary battery 22 to reduce a performance deterioration thereof are accommodated; and a protruding portion 203 protruding from a side surface of the main portion 202 to be attached to the recess portion 103 of the tool main body 100. At a leading end portion of the protruding portion 203 are installed power supplying electrodes Sb1 and Sb2 for supplying an electric power from the secondary battery 22 to the tool main body 100 in such a manner that the power supplying electrode Sb1 is arranged on a surface opposite to a surface on which the power supplying electrode Sb2 is arranged. Further, on another surface of the leading end portion of the protruding portion 203 are installed battery signal electrodes Sb3 and Sb4 for sending and receiving control signals in the tool main body 100. Furthermore, installed on a surface of the main portion 202 is a remaining charge indication unit 25 for indicating an amount of a remaining charge of the secondary battery 22. When the protruding portion 203 is attached to the recess portion 103 of the tool main body 100, the pair of the power supplying electrodes Sb1 and Sb2 and the pair of the battery signal electrodes Sb3 and Sb4 are press-contacted with a pair of power receiving electrodes Sa1 and Sa2 and a pair of main body signal electrodes Sa3 and Sa4, respectively.

As shown in FIG. 2, the remaining charge indication unit 25 includes, for example, a plurality of LEDs (Light Emitting Diodes) 31 arranged in a vertical array (there are shown five of them in FIG. 2 as an example); and an indication switch 32 for turning on/off the LEDs 31 to indicate an amount of the remaining charge. By turning on the indication switch 32, some or all of the LEDs 31, depending on the amount of the remaining charge in the secondary battery 22, are lighted. On the contrary, by turning off the indication switch 32, the lighted LEDs 31 are turned off. In accordance with the present embodiment, all of the LEDs 31 are lighted in case of a fully charged state, and upper ones of the LEDs 31 are turned off first as the amount of the remaining charge is decreased.

FIG. 3 depicts the tool main body 100 in a state where the battery pack 200 is attached to the recess potion 103 in accordance with the preferred embodiment of the present invention.

Figure 4:
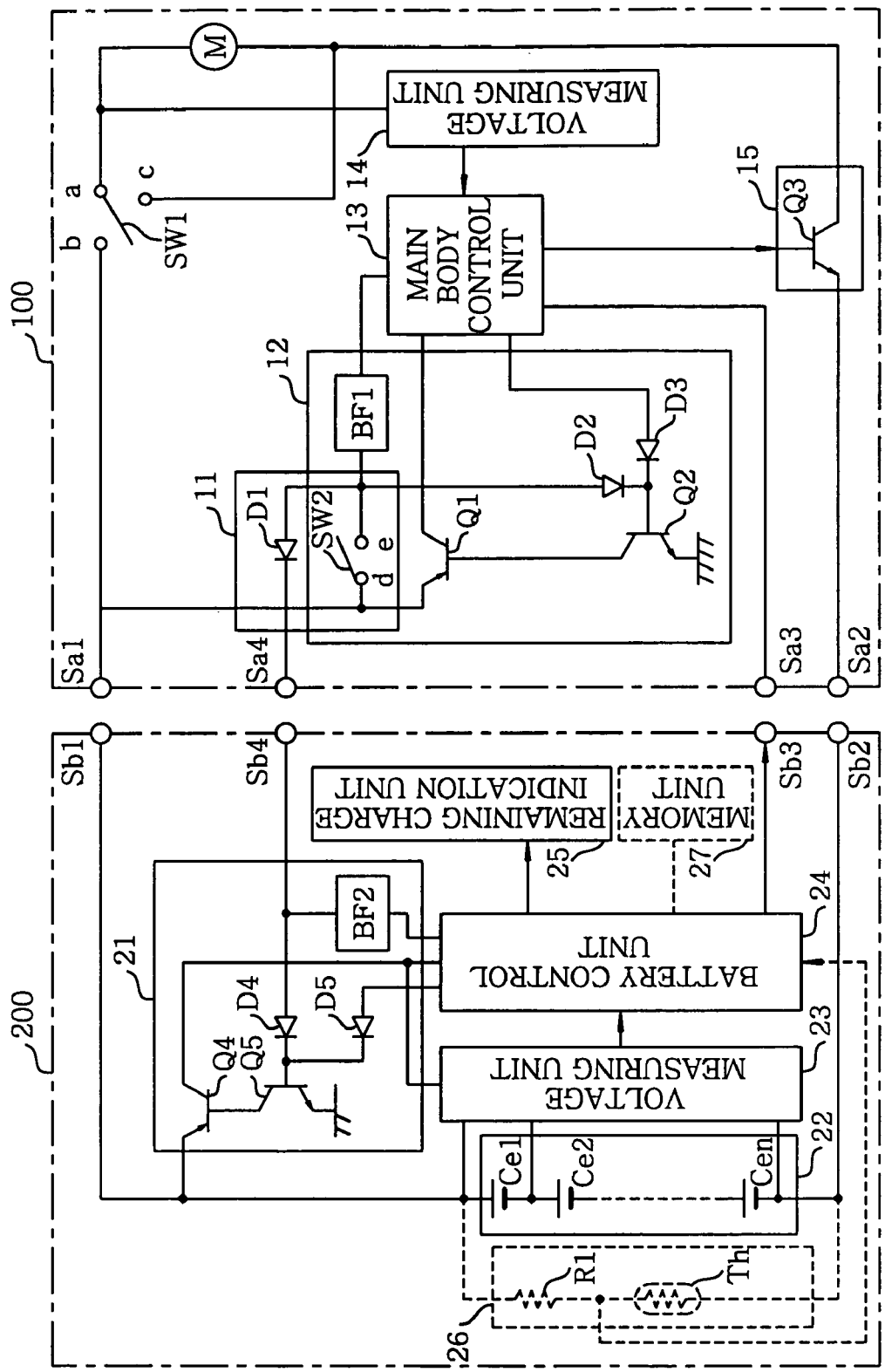
FIG. 4 presents a block diagram showing an electrical configuration of the rechargeable power tool in accordance with the preferred embodiment of the present invention.

FIG. 4 presents a block diagram showing an electrical configuration of the rechargeable power tool in accordance with the preferred embodiment of the present invention. Firstly, an electrical configuration of the tool main body 100 will be described. As shown in FIG. 4, the power receiving electrode Sa1 is connected to a contact point b of a switch SW1, a contact point d of a switch SW2 and an emitter of a PNP type transistor Q1 which is an exemplary switch device having control terminals. A contact point a of the switch SW1 is connected to a power supplying terminal of a motor M, and a contact point c of the SW1 is connected to another power supplying terminal of the motor M as well as a collector of an NPN type power transistor Q3 which is an exemplary switch device having control terminals. An emitter of the transistor Q3 is connected to the power receiving electrode Sa2, and a base of the transistor Q3, which corresponds to a control terminal, is connected to the main body control unit 13. Herein, FET (Field Effect Transistor) may be employed in lieu of the power transistor Q3.

A contact point e of the switch SW2 is connected to anodes of diodes D1 and D2 as well as a buffer BF1 which is in turn connected to the main body control unit 13. A cathode of the diode D1 is connected to the main body signal electrode Sa4. Further, a cathode of the diode D2 is connected to a base of an NPN type transistor Q2 which is an exemplary switch device having a control terminal, wherein the base of the transistor Q2 corresponds to a control terminal.

A collector of the transistor Q1 is connected to the main body control unit 13, and a base of the transistor Q1 is connected to a collector of the transistor Q2, wherein the base of the transistor Q1 corresponds to a control terminal. An emitter of the transistor Q2 is grounded, and the base of the transistor Q2 is connected to cathodes of diodes D2 and D3. Further, an anode of the diode D3 is connected to the main body control unit 13. The main body signal electrode Sa3 is also connected to the main body control unit 13.

The switches SW1 and SW2 are configured to be turned on and off in response to a manipulation of the trigger switch 112. In the switch SW1, the contact point a gets connected to the contact point b when the trigger switch 112 is switched on, and connected to the contact point c when the trigger switch 112 is switched off. In the switch SW2, the contact point d gets connected to the contact point e when the trigger switch 112 is switched on, and disconnected therefrom when the trigger switch 112 is switched off.

In this configuration, the diode D1 and the switch SW2 are included in an operation signal generation unit 11 for outputting a control signal (an on-manipulation signal) indicating that the trigger switch 112 is switched on and another control signal (an off-manipulation signal) that the trigger switch 112 is switched off to the main body signal electrode Sa4, thereby controlling an electric power supply from the secondary battery 22 to the battery control unit 24 in the battery pack 200 in case the battery pack 200 is attached to the tool main body 100. That is, when the battery pack 200 is attached to the tool main body 100 and the trigger switch 112 is switched on, the contact point d is connected to the contact point e in the switch SW2, so that an electric power applied to the power receiving electrode Sa1 is supplied to the main body signal electrode Sa4 via the diode D1. In other words, when the trigger switch 112 is switched on, a voltage level of the main body signal electrode Sa4 changes from a low level L of about 0 V to a high level H approximately corresponding to an output voltage of the secondary battery 22 (on-manipulation signal) On the other hand, when the trigger switch 112 is switched off, the contact point d is disconnected from the contact point e in the switch SW2, so that an electric power applied to the power receiving electrode Sa1 is not supplied to the main body signal electrode Sa4 via the diode D1. In other words, when the trigger switch 112 is switched off, the voltage level of the main body signal electrode Sa4 changes from the high level H to the low level L (off-manipulation signal)

Further, in this configuration, the switch SW2, the buffer BF1, the transistors Q1 and Q2 and the diodes D2 and D3 are included in a main body power supply control unit 12 for starting the main body control unit 13 as well as controlling an electric power supply from the secondary battery 22 to the battery control unit 24 to be started, maintained and suspended in response to the manipulation of the trigger switch 112 in case the battery pack 200 is attached to the tool main body 100. That is, when the battery pack 200 is attached to the tool main body 100 and the trigger switch 112 is switched on, the contact point d is connected to the contact point e in the switch SW2. Thus, an electric power applied to the power receiving electrode Sa1 is supplied to the buffer BF1, adjusted to an input voltage (e.g., 5 V) of the main body control unit 13 therein, and then inputted to the main body control unit 13 as a starting signal. In other words, when the trigger switch 112 is switched on, a voltage level of an output of the buffer BF1 changes from a low level L of about 0 V to a high level H of, e.g., about 5 V. Further, when the battery pack 200 is attached to the tool main body 100 and the trigger switch 112 is switched on, the contact point d is connected to the contact point e in the switch SW2, so that an electric power applied to the power receiving electrode Sa1 is supplied to the base of the transistor Q2 via the diode D2. Thus, the transistor Q2 is turned on to thereby turn on the transistor Q1, so that the electric power is supplied from the power receiving electrode Sa1 to the main body control unit 13 via the transistor Q1.

In this manner, the main body control unit 13 is supplied with the electric power from the power receiving electrode Sa1 via the transistor Q1, and started in response to the starting signal of the high level from the buffer BF1 to start controlling an operation of the tool main body 100. Further, the main body control unit 13 applies a voltage to the base of the transistor Q2 via the diode D3, thereby performing a power supply self-sustaining control for sustaining the power supply from the power receiving electrode Sa1 to the main body control unit 13 via the transistor Q1.

Further, when the trigger switch 112 is switched off, the contact point d is disconnected from the contact point e in the switch SW2, so that a voltage applied to the power receiving electrode Sa1 is not supplied to the buffer BF1, and the main body control unit 13 is informed of an off-manipulation of the trigger switch 112. In other words, when the trigger switch 112 is switched off, the voltage level of the output of the buffer BF1 changes from a high level H to a low level L of about 0 V. Further, when the trigger switch 112 is switched off, the contact point d is disconnected from the contact point e in the switch SW2, so that a voltage applied to the power receiving electrode Sa1 is not supplied to the base of the transistor Q2 via the diode D2, but the transistor Q2 maintains to be on by the power supply self-sustaining control of the main body control unit 13. Thus, the transistor Q2 is turned off due to a suspension of the power supply self-sustaining control of the main body control unit 13 to thereby turn off the transistor Q1, so that an electric power supply from the secondary battery 22 to the main body control unit 13 is suspended.

Further, the trigger switch 112 is, for example, inserted in a power supply line of the motor M, and includes a potentionmeter. A manipulation axis of a variable resistor is rotated to divide a voltage applied to the variable resistor depending on how much the trigger switch 112 is manipulated, e.g., pulled. Thus, a divided voltage depending on a magnitude of the pulling manipulation is outputted to the main body control unit 13 as a manipulation signal.

The main body control unit 13 controls the motor to be started, stopped or rotated at a specific velocity by controlling a period of time for which the transistor Q3 is on, in response to the manipulation signal from the trigger switch 112 and a control signal from the main body signal electrode Sa3, which will be described later. In this manner, the transistor Q3 is included in a pulse control unit 15 for controlling a rotation of the motor M in response to a control operation of the main body control unit 13.

Further, the tool main body 100 includes a voltage measuring unit 14 for measuring a voltage applied to the motor M to output the measured result to main body control unit 13.

The main body control unit 13 has, for example, a microcomputer including a microprocessor for performing a data processing for a control; a memory unit such as a ROM (Read-Only Memory) for storing a control program, data for executing the control program and the like, and a RAM for storing a temporary data to function as a walking memory of the microprocessor; and a peripheral circuit thereof.

Further, when the trigger switch 112 is switched off i.e., the magnitude of the pulling manipulation equals to 0, the contact point a is connected to the contact point c in the switch SW1 as described above. Thus, the two power supplying terminals of the motor M are short-circuited to give rise to a reverse electromotive force by the rotation of the motor M, so that the rotation of the motor M is stopped.

In the following, an electrical configuration of the battery pack 200 will be described. As shown in FIG. 4, the power supplying electrode Sb1 is connected to the power supplying electrode Sb2 via the secondary battery 22 including the plurality of battery cells Ce1 to Cen which are connected serially. Each of the battery cells Ce1 to Cen is connected to a voltage measuring unit 23 for measuring voltages of the battery cells Ce1 to Cen as well as a secondary battery voltage, i.e., a voltage difference between two terminals of the secondary battery 22. The voltage measuring unit 23 includes a first resistor voltage divider for detecting a voltage difference between two terminals of each of the battery cells Ce1 to Cen; and a second resistor voltage divider for measuring the secondary battery voltage.

The battery signal electrode Sb2 is connected to the battery control unit 24 via the buffer BF2, and an anode of the diode D4. A cathode of the diode D4 is connected to a base of an NPN type transistor Q5 which is an exemplary switch device having a control terminal, wherein the base of the transistor Q5 corresponds to a control terminal. A collector of the transistor Q5 is connected to a base of a PNP type transistor Q4 which is an exemplary switch device having a control terminal, wherein the base of the transistor Q4 corresponds to a control terminal. An emitter of the transistor Q5 is grounded. An emitter of the transistor Q4 is connected to the secondary battery 22 (the power supplying electrode Sb1), and a collector of the transistor Q4 is connected to the battery control unit 24. Further, the battery control unit 24 is connected to a base of the transistor Q5 via a diode D5 such that a current flows from the battery control unit 24 to the transistor Q5.

The buffer BF2, the diodes D4 and D5 and the transistors Q4 and Q5 are included in a battery power supply control unit 21 for starting the battery body control unit 24 as well as controlling an electric power supply from the secondary battery 22 to the battery control unit 24 and the voltage measuring unit 23 to be started, maintained and suspended in response to the on-manipulation signal and the off-manipulation signal inputted from the main body signal electrode Sa4 of the tool main body 100 via the battery signal electrode Sb4. That is, when the battery pack 200 is attached to the tool main body 100 and the trigger switch 112 is switched on, as described above, a voltage applied to the power receiving electrode Sa1 is outputted from the main body signal electrode Sa4 via the diode D1 as a starting signal. Therefore, the voltage applied to the power receiving electrode Sa1 is adjusted as an input voltage (e.g., 5V) of the battery control unit 24 by the buffer BF2, and then inputted to the battery control unit 24 as the starting signal. Further, the voltage applied to the power receiving electrode Sa1 is applied to the battery signal electrode Sb4, and then the base of the transistor Q5 via the diode D4. Thus, the transistor Q5 is turned on to thereby turn on the transistor Q4, so that the electric power is supplied from the second battery 22 to the battery control unit 24 via the transistor Q4.

In this manner, the battery control unit 24 is supplied with the electric power from the secondary battery via the transistor Q4 to start control operations for, e.g., controlling the discharge of the secondary battery 22 to suppress the deterioration of the performance of the secondary battery 22. Further, the battery control unit 24 applies a voltage to the base of the transistor Q5 via the diode D5, thereby performing a power supply self-sustaining control for sustaining the power supplied from the secondary battery 22 via the transistor Q4.

Further, when the trigger switch 112 is switched off, a voltage applied to the power receiving electrode Sa1 via the diode D1 is not outputted to the main body signal electrode Sa4 (off-manipulation signal), and thus the electric power applied to the power receiving electrode Sa1 is not inputted to the buffer BF2, so that the battery control unit 24 is informed of an off-manipulation of the trigger switch 112. In other words, when the trigger switch 112 is switched off, the voltage level of the output of the buffer BF2 changes from a high level to a low level of about 0 V. Further, when the trigger switch 112 is switched off, a voltage applied to the power receiving electrode Sa1 via the diode D1 is not outputted from the main body signal electrode Sa4, and thus not supplied to the base of the transistor Q5 via the diode D4. However, the transistor Q5 maintains to be on by the power supply self-sustaining control of the battery control unit 24. Further, the transistor Q5 is turned off due to a suspension of the power supply self-sustaining control of the battery control unit 24 to thereby turn off the transistor Q4, so that an electric power supply from the secondary battery 22 to the battery control unit 24 and the voltage measuring unit 23 is suspended.

The battery control unit 24 determines whether the secondary battery 22 is in a fully charged state, a nearly fully charged state, a normal charged state or an overdischarged state by an output of the voltage measuring unit 23 based on a table or an equation representing a relation between the charged state and a voltage difference between two end portions of the battery cell Ce, or a table or an equation representing a relation between the charged state and a voltage difference between two end portions of the secondary battery 22. Thereafter, based on the determination, the battery control unit 24 controls a period of time for which the voltage is applied to the base of the transistor Q5 via the diode D5 (i.e., a period of time for which the power supply self-sustaining control is performed) to thereby control a period of time for which an electric power is supplied from the secondary battery 22 as well as a period of time for which the battery control unit 24 is operated. The fully charged state is a state where the secondary battery is charged to the full battery charge capacity. The nearly fully charged state is a state that can be practically regarded as a fully charged state, and defined based on, e.g., experiment results by considering, e.g., the type of the cell for protecting the battery cell Ce from a performance deterioration. For example, the nearly fully charged state is a state where the secondary battery is charged more than or equal to 85%, 80% or 75% of the battery charge capacity but less than that of the fully charged state. The overdischarged state is a state where, the secondary battery is discharged but the performance deterioration is not occurred such that a set voltage level of the fully charged state can be recovered by being recharged. If at least one of the battery cells are in the overdischarged state, the secondary battery 22 is determined to be in the overdischarged state.

The battery control unit 24 includes, for example, a microcomputer including a microprocessor for performing a data processing for a control; a memory unit such as a ROM (Read-Only Memory) for storing a control program, data for executing the control program and the like, and a RAM for storing a temporary data to function as a walking memory of the microprocessor; and a peripheral circuit thereof.

Hereinafter, the operation of the preferred embodiment will be described.

Operation of the Preferred Embodiment

Figure 5:
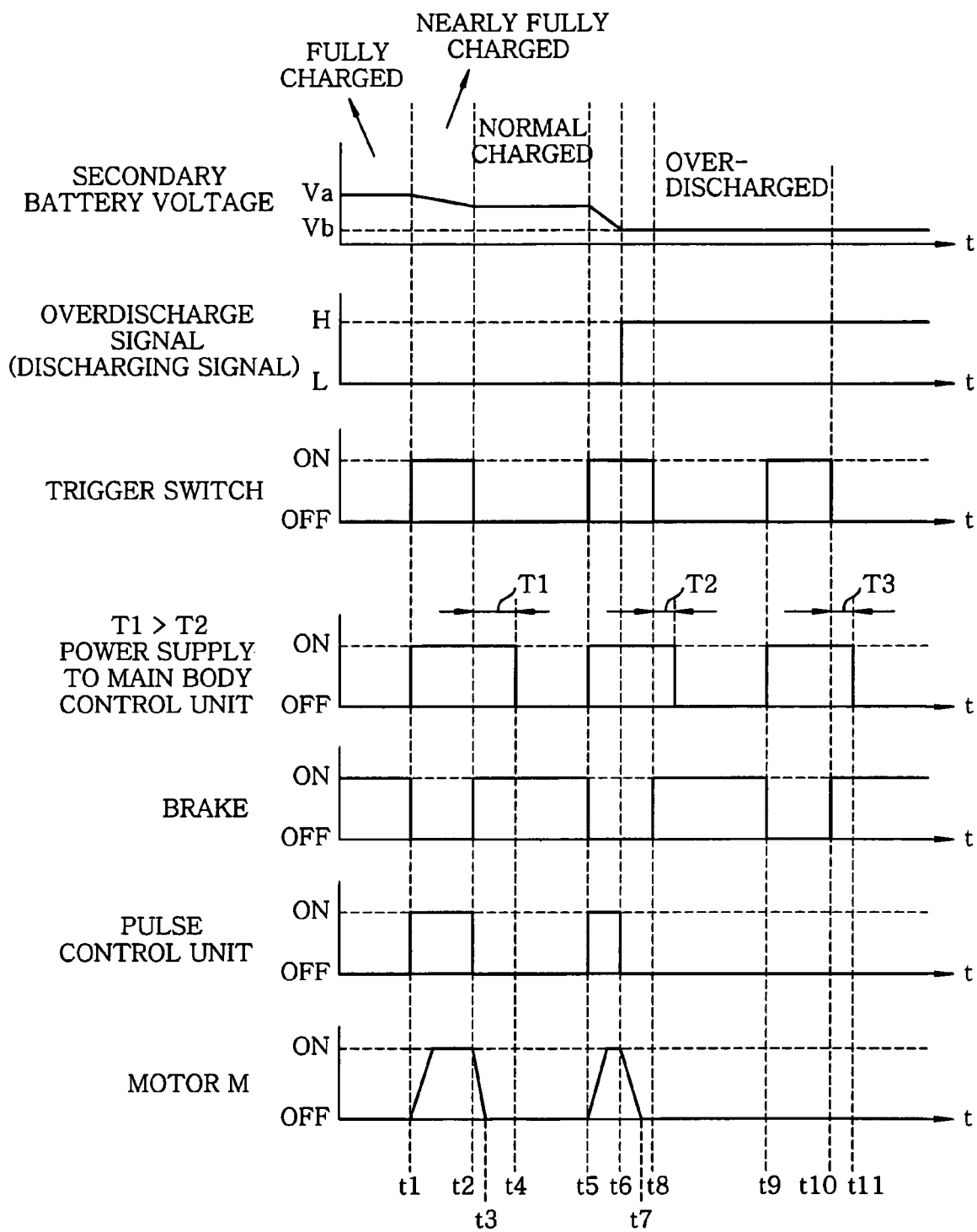
FIG. 5 provides a timing chart for describing the operation of the tool main body 100 in accordance with the preferred embodiment.

Firstly, the operation of the tool main body 100 will be explained. FIG. 5 provides a timing chart for describing the operation of the tool main body 100 in accordance with the preferred embodiment. In FIG. 5 are depicted the secondary battery voltage (i.e., the voltage difference between the two terminals of the secondary battery 22), the overdischarge signal (discharging signal), the operation of the trigger switch, the power supply to the main body control unit 13, the operation of the brake, and the operations of the pulse control unit 15 and motor M.

When the battery pack 200 is attached to the tool main body 100, the power receiving electrodes Sa1 and Sa2 of the tool main body 100, and main body signal electrodes Sa3 and Sa4 are press-contacted to the power supplying electrodes Sb1 and Sb2 of the battery pack 200, and the battery signal electrodes Sb3 and Sb4, respectively. If the second battery 22 is in the fully charged state (e.g., at a preset voltage level Va), when the trigger switch 112 is manipulated (a timing t1), the switches SW1 and SW2 are switched on in response to the trigger switch 112. That is, the contact point a of the switch SW1 gets connected to the contact point b, and the contact point d of the switch SW2 gets connected to the contact point e.

Thus, the on-manipulation signal is outputted to the main body signal electrode Sa4 via the diode D1 so that it can be outputted to the battery pack 200. Further, the starting signal is inputted to the main body control unit 13 via the buffer BF1, thereby sequentially turning on the transistors Q2 and Q1 to supply the electric power to the main body control unit 13 from the secondary battery 22 via the transistor Q1. Then, the main body control unit 13 is started to start the control of the tool main body 100.

Further, since the secondary battery 22 is in the fully charged state, the discharging signal is being outputted from the battery control unit 24. Therefore, the main body control unit 13 outputs a pulse signal to the pulse control unit 15 corresponding to the magnitude of the pulling manipulation to thereby control the motor M by a pulse control, i.e., a PWM control. Thus, the motor M is driven to be rotated at a rotational velocity corresponding to the magnitude of the pulling manipulation. More specifically, the motor M is driven at a low rotational velocity when the magnitude of the pulling operation is small, whereas the motor M is driven at a high rotational velocity when the magnitude of the pulling operation is large.

Further, when the trigger switch is switched off, i.e., the magnitude of the pulling manipulation is equal to 0 (a timing t2), the main body control unit 13 stops outputting the pulse signal to the pulse control unit 15. Thus, the transistor Q3 moves into a state where the switch device is not on, thereby stopping the power supply to the motor M. At this time, the switches SW1 and SW2 are also turned off in response to the trigger switch 112. That is, the contact point a of the switch SW1 gets connected to the contact point c to thereby short-circuit the two power supplying terminals of the motor M, so that a brake is applied for the motor M to be stopped abruptly (a timing t3). Thereafter, the contact point d of the switch SW2 gets disconnected from the contact point e to thereby cancel the starting signal inputted to the main body control unit 13 via the buffer BF1.

Since the discharging signal is outputted from the battery control unit 24, the main body control unit 13 applies a voltage to the base of the transistor Q2 via the diode D3 for a preset period of time T1, so that the power supply from the secondary battery 22 to the transistor Q1 is maintained. The preset period of time T1 is set to be, e.g., 1 second to 10 minutes.

As described above, in accordance with the preferred embodiment, the operation of the main body control unit 13 is suspended after the preset period of time T1 elapses from switching off the trigger switch 112 to stop the power supply to the motor M, so that the power consumption dissipated by the main body control unit 13 can be suppressed efficiently. Further, since the main body control unit 13 is in operation during the preset period of time T1, an output torque of the motor M and/or a mode of the rotation, for example, can be set by being inputted from a setting input unit (not shown) thereto.

Further, when the trigger switch is switched on again (a timing t5) during the time the discharging signal is being outputted from battery control unit 24, the motor M is driven to be rotated by a pulse control in accordance with the operation described above.

However, when the secondary battery 22 moves into the overdischarged state, e.g., by reaching a first overdischarge threshold voltage level Vb, the overdischarge signal is outputted during the time the trigger switch 112 is on (a timing t6). In this case, the main body control unit 13 stops outputting the pulse signal to the pulse control unit 15 although the trigger switch 112 is on. Thus, the transistor Q3 moves into a state where the switch device is not on, thereby stopping the power supply to the motor M. However, since the trigger switch 112 is on, the two power supplying terminals of the motor M are not short-circuited, so that the brake is not applied and the motor M is stopped gradually (a timing t7). Therefore, a time interval between t2 and t3 is shorter than that between t6 and t7.

Subsequently, when the user switches off the trigger switch 112 (a timing t8) after the power supply to the motor M is stopped, the switches SW1 and SW2 are also switched off in response thereto. Since the overdischarge signal is being outputted from the battery control unit 24, the main body control unit 13 applies a voltage to the base of the transistor Q2 via the diode D3 only for a preset period of time T2 that is shorter than T1 to thereby maintain the power supply from the second battery 22 via the transistor Q1. The preset period of time T2 is set to be shorter than T1, for example, 0 to 5 seconds.

As described above, in accordance with the preferred embodiment, when the second battery 22 moves into the overdischarged state so that the overdischarge signal is outputted from the battery control unit 24, the power supply to the motor M is stopped. In this manner, a performance deterioration of the secondary battery 22 can be prevented.

Further, when the trigger switch 112 is switched on (a timing t9) during the time the second battery 22 is in the overdischarged state and thus the overdischarge signal is outputted from the battery control unit 24, the switches SW1 and SW2 are turned on in response to the manipulation of the trigger switch 112. Therefore, the on-manipulation signal is outputted to the main body signal electrode Sa4 via the diode D1, so that the starting signal is inputted to the main body control unit 13 via the buffer BF1. Thus, an electric power is applied to the main body control unit 13 from the secondary battery 22 via the transistor Q1. Then, the main body control unit 13 is started, thereby starting a control of the tool main body 100. In this case, since the overdischarge signal is being outputted from the battery control unit 24, the main body control unit 13 does not output the pulse signal to the pulse control unit 15 although a signal depending on the magnitude of the pulling manipulation has been inputted thereto. Therefore, the motor M remains stopped.

Thereafter, when the user switches off the trigger switch 112 (a timing t10) because the motor M remains stopped, the switches SW1 and SW2 are also switched off in response thereto. Since the overdischarge signal is being outputted from the battery control unit 24, the main body control unit 13 applies a voltage to the base of the transistor Q2 via the diode D3 only for the preset period of time T2 to thereby maintain the power supply from the second battery 22 via the transistor Q1 (a timing t11).

As described above, in accordance with the preferred embodiment, while the second battery 22 moves into the overdischarged state so that the overdischarge signal is outputted from the battery control unit 24, the power supply to the motor M remians stopped even if the trigger switch 112 is switched on. In this manner, a discharge from the secondary battery 22 is suppressed so that a performance deterioration of the secondary battery 22 can be prevented.

Figure 6:
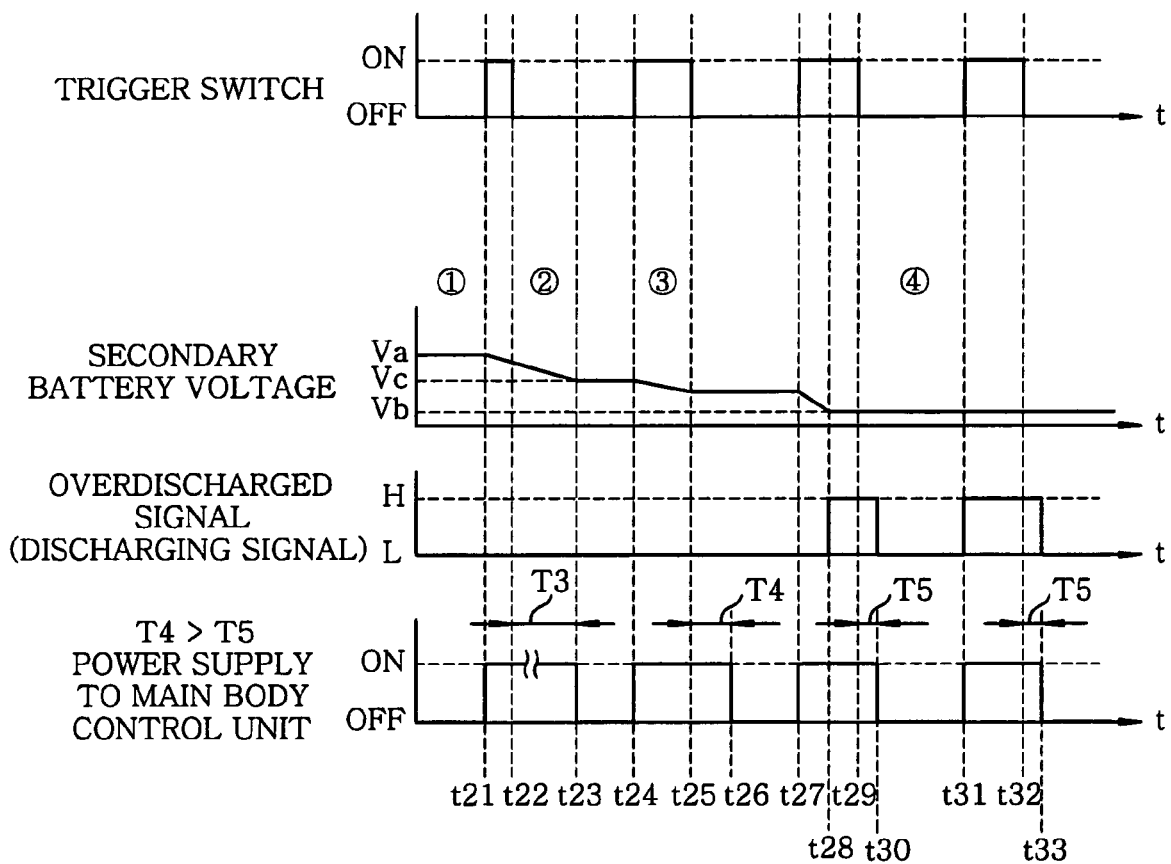
FIG. 6 offers a timing chart for describing the operation of the battery pack 200 in accordance with the preferred embodiment.

Secondly, the operation of the battery pack 200 will be described. FIG. 6 offers a timing chart for describing the operation of the battery pack 200 in accordance with the preferred embodiment. In FIG. 6 are depicted the operation of the trigger switch 112 in the tool main body 100, the secondary battery voltage (i.e., the voltage difference between the two terminals of the secondary battery 22), the overdischarge signal (discharging signal) and the power supply to the battery control unit 24.

If the battery pack 200 is attached to the tool main body 100, and the second battery 22 is in the fully charged state (e.g., at the preset voltage level Va), when the user of the power tool 10 manipulates the trigger switch 112 (a timing t21), the switches SW1 and SW2 are switched on in response to the manipulation of the trigger switch 112. Therefore, as described above, the on-manipulation signal is outputted from the main body signal electrode Sa4 via the diode D1 so that the on-manipulation signal is inputted to the battery signal electrode Sb4.

As a result, the voltage applied to the power receiving electrode Sa1 is applied to the base of the transistor Q5 via the switch SW2, the diode D1, the main body signal electrode Sa4, the battery signal electrode Sb4 and the diode D4. Thus, the transistor Q5 is turned on to turn on the transistor Q4, so that an electric power is supplied to the voltage measuring unit 23 and the battery control unit 24 from the secondary battery 22 via the transistor Q4. Further, the starting signal is inputted to the battery control unit 24 via the buffer BF2.

Then, the battery control unit 24 is started to start a control operation for protecting the secondary battery 22. Specifically, the battery control unit 24 determines the state of the secondary battery 22 based on the output of the voltage measuring unit 23. Herein, when the indication switch 32 in the remaining charge indication unit 25 is turned on, the battery control unit 24 turns on and off the light of the LEDs 31 based on the determined state of the secondary battery 22. The battery control unit 24 outputs either the discharging signal or the overdischarge signal, depending on the determined state of the secondary battery 22, to the battery signal electrode Sb3. In this case, since the state of the secondary battery 22 is the fully charged state, the discharging signal is outputted.

Subsequently, when the trigger switch 112 is switched off (a timing t22), the starting signal from the buffer BF2 is canceled, and the battery control unit 24 determines the state of the secondary battery 22 based on the output of the voltage measuring unit 23. Based on the determined state of the secondary battery 22, the voltage control unit 24 controls a period of time for which a voltage is applied to the base of the transistor Q5 via the diode D5, thereby controlling a period of time for which an electric power is applied from the secondary battery 22. In this case, since the state of the secondary battery 22 is nearly fully charged state, the battery control unit 24 applies a voltage to the base of the transistor Q5 via the diode D5 only for a preset period of time T3 to thereby maintain the power supply from the secondary battery 22 via the transistor Q4. The preset period of time T3 is set to be sufficiently long, e.g., 30 to 60 minutes. Moreover, even when the state of the secondary battery 22 is the fully charged state, the battery control unit 24 applies a voltage to the base of the transistor Q5 via the diode D5 only for the preset period of time T3 to thereby maintain the power supply from the secondary battery 22 via the transistor Q4.

Then, when the preset period of time T3 elapses, the battery control unit 24 suspends the voltage application to the base of the transistor Q5 via the diode D5 to thereby cut off the power supply from the secondary battery 22 (a timing t23).

As described above, in accordance with the preferred embodiment, an electric power is supplied from the secondary battery 22 to the battery control unit 24 in case of the fully charged state or the nearly fully charged state, thereby allowing the battery control unit to operate. More specifically, in accordance with the preferred embodiment, the secondary battery 22 is discharged until the secondary battery 22 is turned into the normal charged state after the fully charged state and then the nearly fully charged state. Thus, it is possible to reduce a performance deterioration especially if the secondary battery 22 is, e.g., a lithium-ion secondary battery whose performance such as a battery charge capacity is deteriorated when left in a fully charged state for a long period of time.

Further, if the secondary battery 22 is in the normal charged state, when the trigger switch is manipulated by the user of the power tool 10 (a timing t24), an electric power is supplied to the battery control unit 24 from the secondary battery 22 to thereby allow the battery control unit 24 to perform a control operation for suppressing the performance deterioration of the secondary battery 22 in accordance with operations as described above.

Then, when the trigger switch 112 is switched off (a timing t22), the starting signal from the buffer BF2 is canceled, and the battery control unit 24 determines the state of the secondary battery 22 based on the output of the voltage measuring unit 23. If the determined state of the secondary battery 22 is the normal charged state, the battery control unit 24 applies a voltage to the base of the transistor Q5 via the diode D5 only for a preset period of time T4 that is shorter than T3 to thereby maintain the power supply from the secondary battery 22 via the transistor Q4. The preset period of time T4 is set to be, e.g., 30 seconds to 10 minutes.

As described above, in accordance with the preferred embodiment, the battery control unit 13 does not operate after the preset period of time T4 elapses from switching off the trigger switch 112, so that the power consumption dissipated by the battery control unit 24 can be suppressed efficiently. Further, since the battery control unit 24 is in operation during the preset period of time T4, specific operations can be performed. For example, during the time the battery control unit 24 is in operation, the remaining charge indication unit 25 is operated to thereby indicate the remaining charge by operating the indication switch 32.

Otherwise, if the secondary battery 22 is in the normal charged state, and the user of the power tool 10 manipulates the trigger switch 112 (a timing t27), an electric power is supplied to the secondary battery 22 from the battery control unit 24 so that the battery control unit 24 performs an operation for protecting the secondary battery 22, in accordance with the operations described above.

In this case, when the secondary battery 22 is turned into the overdischarged state, e.g., by reaching the first overdischarge threshold voltage level Vb, the battery control unit 24 outputs the overdischarge signal from the battery signal electrode Sb3 (a timing t28). When the overdischarge signal is outputted to the tool main body 100 from the battery pack 200, as described above, the main body control unit 13 stops outputting the pulse signal to the pulse control unit 15 although the trigger switch 112 is on to thereby stop the motor M. Further, when the user switches off the trigger switch 112 (a timing t29) after the power supply to the motor M is stopped, the starting signal from the buffer BF2 is canceled, and the battery voltage control unit 24 determines the state of the secondary battery 22 based on the output of the voltage measuring unit 23. In this case, since the secondary battery 22 is in the overdischarged state, the battery control unit 24 applies a voltage to the base of the transistor Q5 via the diode D5 only for a preset period of time T5 that is shorter than T4 to thereby maintain the power supply from the secondary battery 22 via the transistor Q4. The preset period of time T5 is set to be, e.g., 0 to 30 seconds.

As described above, in accordance with the preferred embodiment, if the secondary battery 22 is turned into the overdischarged state, the main body control unit 24 does not operate after the preset period of time T5 elapses from switching off the trigger switch 112, so that the power consumption dissipated by the battery control unit 24 can be suppressed efficiently. Further, since the battery control unit 24 is in operation during the preset period of time T5, specific operations can be performed during the time the battery control unit 24 is in operation.

As described above, in accordance with the preferred embodiment, since a priority is given to either a convenience for the user to use the power tool 10 or a protection of the secondary battery 22 from a complete discharge depending on the state of the secondary battery 22, it is possible to achieve the convenience for the user to use the power tool 10 as well as the protection of the secondary battery 22 from a complete discharge.

Further, when the trigger switch 112 is switched on (a timing t31) during the time the second battery 22 is in the overdischarged state, an electric power is applied to the battery control unit 24 from the secondary battery 22 so that the battery control unit 24 performs a control operation for suppressing the performance deterioration of the secondary battery 22, in accordance with the operations described above. Thus, the battery control unit 24 outputs the overdischarge signal from the battery signal electrode Sb3 (a timing t31). When the overdischarge signal is outputted to the tool main body 100 from the battery pack 200, the main body control unit 13 does not output the pulse signal to the pulse control unit 15 although the trigger switch 112 remains to be on, so that the motor M is stopped. Further, when the motor M is stopped and the user switches off the trigger switch 112 (a timing t32), the battery voltage control unit 24 determines the state of the secondary battery 22 based on the output of the voltage measuring unit 23. In this case, since the determined state of the secondary battery 22 is in the overdischarged state, the battery control unit 24 applies a voltage to the base of the transistor Q5 via the diode D5 only for the preset period of time T5 to thereby maintain the power supply from the secondary battery 22 via the transistor Q4.

As described above, in accordance with the preferred embodiment, when the trigger switch 112 is switched on, the power tool 10 starts to supply the power to the battery control unit 24 from the secondary battery 22. Thus, since there is no idling current flowing, the performance deterioration of the secondary battery 22 can be reduced compared to the prior art. Further, when the trigger switch 112 is switched off, a period of time for which the electric power is supplied from the secondary battery 22 is adjusted depending on the state of the secondary battery 22, so that a power consumption dissipated by the battery control unit 24 can be suppressed efficiently while specific operations can be performed. Therefore, it is possible to achieve the convenience for the user to use the power tool 10 as well as the protection of the secondary battery 22 from a complete discharge.

Figure 7:
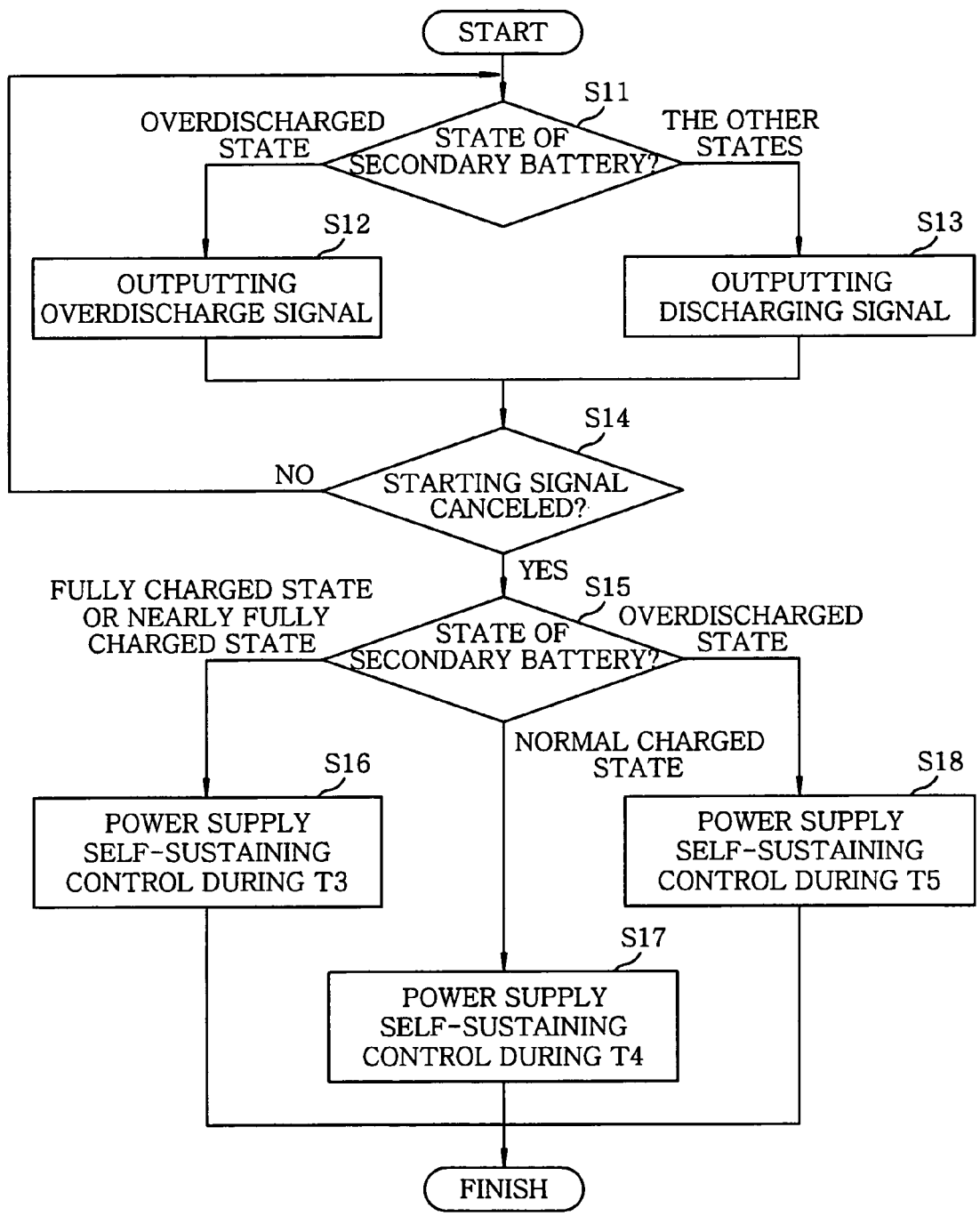
FIG. 7 is a flow chart for showing the operation of the battery control unit in accordance with the preferred embodiment.

Hereinafter, the operation of the battery control unit 24 will be described with reference to FIG. 7. FIG. 7 is a flow chart for showing the operation of the battery control unit in accordance with the preferred embodiment. As shown therein and as described above, when the trigger switch 112 is manipulated by the user of the power tool 10 such that the on-manipulation signal is inputted to the battery signal electrode Sb4 from the main body signal electrode Sa4, the starting signal is inputted to the battery control unit 24 via the buffer BF2 to thereby start the operation of the battery control unit 24. Then, firstly, the state of the secondary battery 22 is determined (S11). If the secondary battery 22 is determined to be in the overdischarged state, the overdischarge signal is outputted to the tool main body 100 from the battery pack 200 (S12). However, if the secondary battery 22 is determined to be in the fully charged state, the nearly fully charged state or the normal charged state (i.e., any state other than the overdischarged state), the discharging signal is outputted to the tool main body 100 from the battery pack 200 (S13). Thereafter, it is determined whether or not the starting signal is canceled (S14). If it is determined that the starting signal is not canceled, the process returns to the step S11 so that the steps S11 to S13 are performed again. However, if it is determined that he starting signal is canceled, the state of the secondary battery 22 is determined (S15).

Then, if the secondary battery 22 is determined to be in the fully charged state or the nearly fully charged state, the power supply self-sustaining control is performed for the preset period of time T4, and the battery control unit 24 stops the operation when the preset period of time T4 elapses (S17).

However, if the secondary battery 22 is determined to be in the overdischarged state in the step S15, the power supply self-sustaining control is performed for the preset period of time T5, and the battery control unit 24 stops the operation when the preset period of time T5 elapses (S18).

Further, although the voltage measuring unit 23 in the above description of the preferred embodiment is configured to measure each of the voltage differences between the battery cells Ce1 to Cen individually, the voltage measuring unit 23 may also be configured to measure a plurality of the voltage differences therebetween at the same time.

In addition, the battery pack 200 in accordance with the preferred embodiment may further include a battery temperature measuring unit 26 for measuring a temperature of the battery cells Ce1 to Cen in the secondary battery 22, as depicted by dotted lines in FIG. 4. The battery temperature measuring unit 26 is configured such that, for example, a resistor element R1 and a thermistor Th directly connected to each other are connected to the secondary battery in parallel, and a node at which the resistor element R1 is connected to the thermistor Th is connected to the battery control unit 24 as an output terminal of the battery temperature measuring unit 26. An output of the battery temperature measuring unit 26 is decreased as a battery temperature is lowered, because a resistance of the thermistor Th is decreased as the battery temperature is lowered. The battery temperature measuring unit 26 may be used for the battery control unit 24 to output the overdischarge signal if the battery temperature of the secondary battery 22 is abnormally high, e.g., 70° C., 75° C. or 80° C., to prevent a deterioration of the secondary battery 22 due to the high temperature. Further, since an overdischarge threshold level, by which the battery control unit 24 determines whether the secondary battery 22 is in the overdischarged state, varies with the temperature, the battery temperature measuring unit 26 may also be used for the battery control unit 24 to compensate the overdischarge threshold level based on the battery temperature of the secondary battery 22. When the battery temperature is higher than a specific standard temperature level, the overdischarge threshold level is compensated to be higher than that at the standard temperature level. However, when the battery temperature is lower than the standard temperature level, the overdischarge threshold level is compensated to be lower than that at the standard temperature level. Further, the battery temperature measuring unit 26 may be configured to measure each of the voltage differences between the battery cells Ce1 to Cen individually, and may also be configured to measure a plurality of the voltage differences therebetween at the same time. In this case, the battery temperature of the secondary battery 22 is set to be a maximum, a minimum or an average value of the voltage differences between the battery cells.

Further, the battery pack 200 in accordance with the preferred embodiment may further include a memory unit 27 having a rewritable nonvolatile memory device such as an EEPROM (Electrically Erasable Programmable Read Only Memory) for storing the state of the secondary battery 22, as depicted by dotted lines in FIG. 4.

In this case, the battery control unit 24 has the memory unit 27 store the state of the secondary battery 22 before the battery control unit 24 stops the operation, and reads out the stored state of the secondary battery 22 from the memory unit 27 when the subsequent operation is started. Thereafter, the battery control unit 24 outputs either the discharging signal or the overdischarge signal to the battery signal electrode Sb3 depending on the state of the secondary battery 22 read out from the memory unit 27, and, at the same time, controls a period of time for which an electric power is applied to the base of the transistor Q5 via the diode D5 based on the state of the secondary battery 22 read out from the memory unit 27. With this configuration, the battery control unit 24 can output a control signal to the battery signal electrode Sb3 to thereby control the period of time for the power application by reading out the state of the secondary battery 22 from the memory unit 27, even if the user manipulated the trigger switch 112 for a period of time that is too short to determine the state of the secondary battery 22 by the voltage measuring unit 23 but long enough to read out the state of the secondary battery 22 from the memory unit 27. Therefore, even in this case, it can be assured to perform the control for suppressing the performance deterioration of the secondary battery 22.

However, the battery control unit 24 may be configured such that, if the secondary battery 22 is determined to be in the overdischarged state based on the output of the voltage measuring unit 23, the battery control unit 24 has the memory unit 27 store the state of the secondary battery 22 as the overdischarged state, and, when a next operation is started, the battery control unit 24 reads out the state of the secondary battery 22 from the memory unit 27. In this case, if the state of the secondary battery 22 read out from the memory unit 27 is the overdischarged state, the battery control unit 24 stops to supply the power to the base of the transistor Q5 via the diode D5 to thereby stop the power supply from the secondary battery 22 immediately. With this configuration, in case of the overdischarged state, the discharge of the secondary battery 22 can be suppressed efficiently to thereby prevent a complete discharge.

Further, the memory unit 27 may be configured to store the number of the overdischarged states. In this case, the battery control unit 24 may be configured such that, if the secondary battery 22 is determined to be in the overdischarged state based on the output of the voltage measuring unit 23, the battery control unit 24 has the memory unit 27 to increase the number of the overdischarged states, and, when a next operation is started, the battery control unit 24 reads out the number of the overdischarged states from the memory unit 27. In this configuration, if the number of the overdischarged states is not less than a predetermined number such as 3, 4 or 5, the battery control unit 24 stops the power supply to the base of the transistor Q5 via the diode D5 to thereby stop the power supply from the secondary battery 22 immediately. With this configuration, in case of the overdischarged state, the discharge of the secondary battery 22 can be suppressed efficiently to thereby prevent a complete discharge.

Still further, the memory unit 27 may also be configured to store the secondary battery voltage and the voltage difference between the end portions of each of the battery cells Ce1 to Cen, instead of the state of the secondary battery 22. Also with this configuration, the effect described above can be obtained.

Still further, the voltage control unit 24 in accordance with the preferred embodiment may also be configured such that the overdischarge threshold level, by which the battery control unit 24 determines whether or not the secondary battery 22 is in the overdischarged state, is changed during a preset period of time Ta after the manipulation of the trigger switch 112. More specifically, the voltage control unit 24 in accordance with the preferred embodiment may be configured to use a normal overdischarge threshold level Vb for determining whether or not the secondary battery 22 is in the overdischarged state after the preset period of time Ta elapsed from the time of the manipulation of the trigger switch 112, and an instantaneous overdischarge threshold level Vbm lower than the normal overdischarge threshold level Vb for determining whether or not the secondary battery 22 is in the overdischarged state until the preset period of time Ta is elapsed from the time of the manipulation of the trigger switch 112. If, for example, the normal overdischarge threshold level for one of the battery cells is 2 V, the instantaneous overdischarge threshold level is set to be 1.5 to 1.0 V, which is lower than the normal overdischarge threshold level by 0.5 to 1.0 V.

Figure 8A:
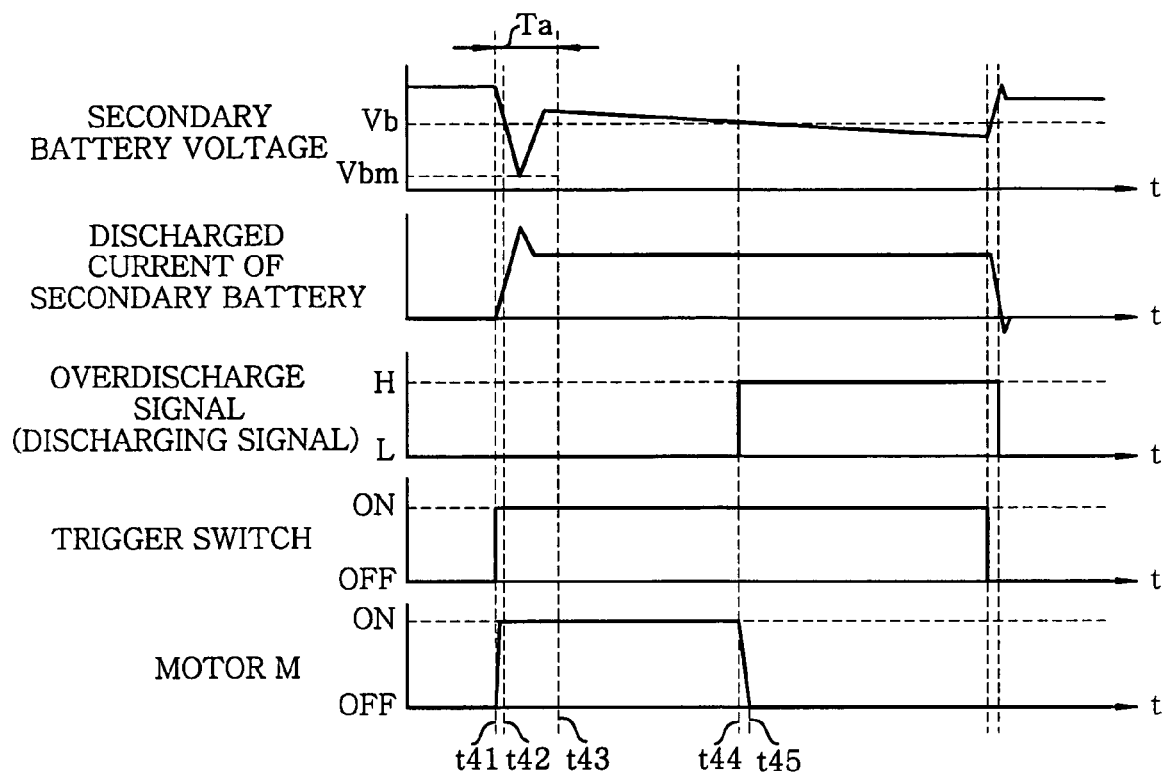
FIGS. 8A and 8B show timing charts for cases where an overdischarge threshold level may be a normal constant overdischarge threshold level and an instantaneous overdischarge threshold level, respectively.
Figure 8B:
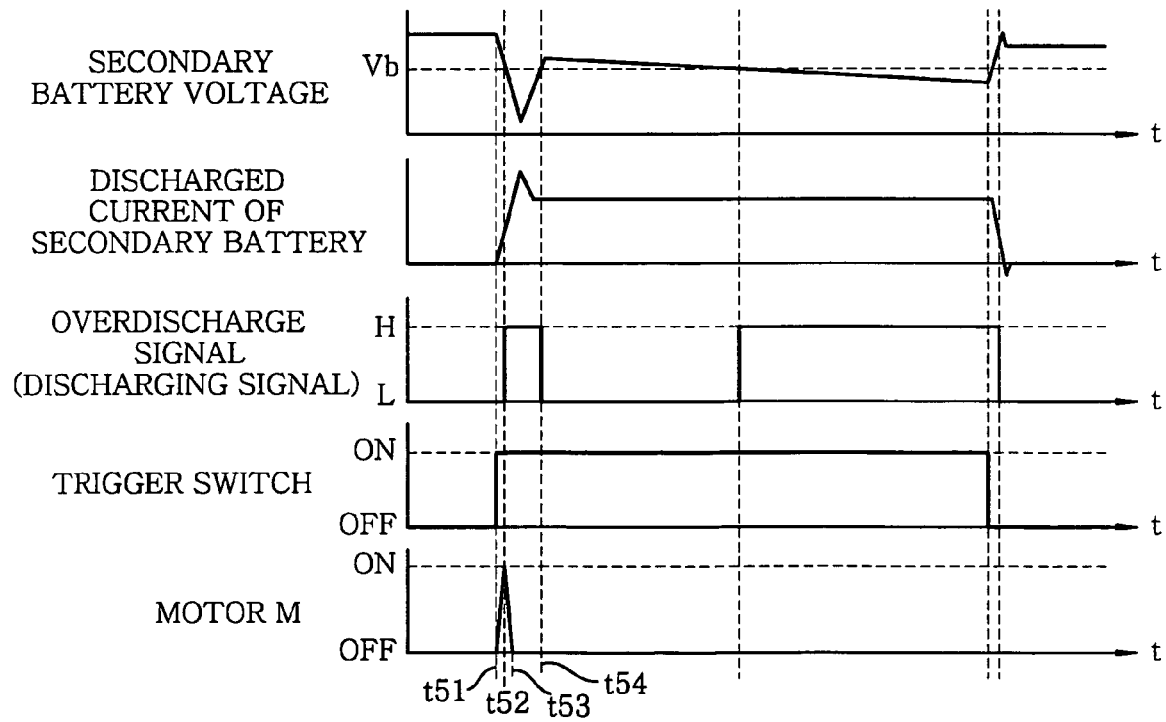

FIGS. 8A and 8B show timing charts for a case where the overdischarge threshold level may be either the normal overdischarge threshold level or the instantaneous overdischarge threshold level, and for another case where the overdischarge threshold level is a constant, respectively.

In most cases, the secondary battery voltage drops rapidly right after the manipulation of the trigger switch 112. Thus, as shown in FIG. 8B, if, for example, the secondary battery voltage is close to the normal overdischarge threshold level Vb, when the trigger switch 112 is switched on (a timing t51), the secondary battery voltage becomes lower than or equal to the normal overdischarge threshold level Vb due to the rapid voltage drop (a timing t52). Thus, as described above, the battery control unit 24 in the battery pack 200 will determine the state of the secondary battery to be an overdischarged state, and will output the overdischarge signal to the main body control unit 13 in the tool main body 100. Therefore, although the trigger switch 112 remains on, the power supply to the motor M will be cut off (a timing t52) by the control of the main body control unit 13, so that the motor M will be stopped (a timing t53).

Therefore, as shown in FIG. 8A, the battery control unit 24 is preferably configured such that the overdischarge threshold level is set to be the instantaneous overdischarge threshold level Vbm instead of the normal overdischarge threshold level Vb during the preset period of time Ta after the manipulation of the trigger switch 112. With this configuration, if, for example, the secondary battery voltage is close to the normal overdischarge threshold level Vb, when the trigger switch 112 is switched on (a timing t41), the battery control unit 24 will determine the state of the secondary battery 22 based on the instantaneous overdischarge threshold level Vbm. Therefore, even if the secondary battery voltage becomes lower than or equal to the normal overdischarge threshold level Vb (a timing t42) due to the rapid voltage drop, the battery control unit 24 will determine the state of the secondary battery 22 to be the normal charged state instead of the overdischarged state, thereby letting the motor M continue to rotate. Further, the battery control unit 24 changes the overdischarge threshold level from the instantaneous overdischarge threshold level Vbm to the normal overdischarge threshold level Vb when the preset period of time Ta has elapsed from the manipulation of the trigger switch 112 (a timing t43). Thus, if the secondary battery voltage becomes lower than or equal to the normal overdischarge threshold level Vb (a timing t44), the overdischarge signal is outputted to the main body control unit 13 in the tool main body 100 from the battery control unit 24 in the battery pack 200. Therefore, although the trigger switch 112 remains on, the power supply to the motor M is cut off (a timing t44) by the control of the main body control unit 13, so that the motor M is stopped (a timing t45).

As described above, by configuring the battery control unit 24 to have the instantaneous overdischarge threshold level Vbm, instead of the normal overdischarge threshold level Vb, as the overdischarge threshold level during the preset period of time Ta after the manipulation of the trigger switch 112, a rapid voltage drop that occurs right after the manipulation of the trigger switch 112 can be masked and the overdischarged state of the secondary battery 22 can be properly determined based on the normal overdischarge threshold level Vb. Therefore, the secondary battery 22 can be used until the secondary battery voltage reaches the normal overdischarge threshold level Vb, so that the battery pack 200 becomes more convenient to use. The preset period of time Ta, that is used to reduce the effect of the rapid voltage drop occurring to the secondary battery right after the manipulation of the trigger switch 112, is set properly based on, e.g., experiments. The preset period of time Ta is set to be, for example, in a range from 100 to 1000 msec such as 400, 500 or 600 msec.

Further, in accordance with another preferred embodiment, a tool main body is configured to further include a main body one-shot circuit 121 for applying a pulse-shaped voltage to the diode D2, and a battery pack is configured to further include a battery one-shot circuit 28 for applying a pulse-shaped voltage to the diode D4.

Figure 9:
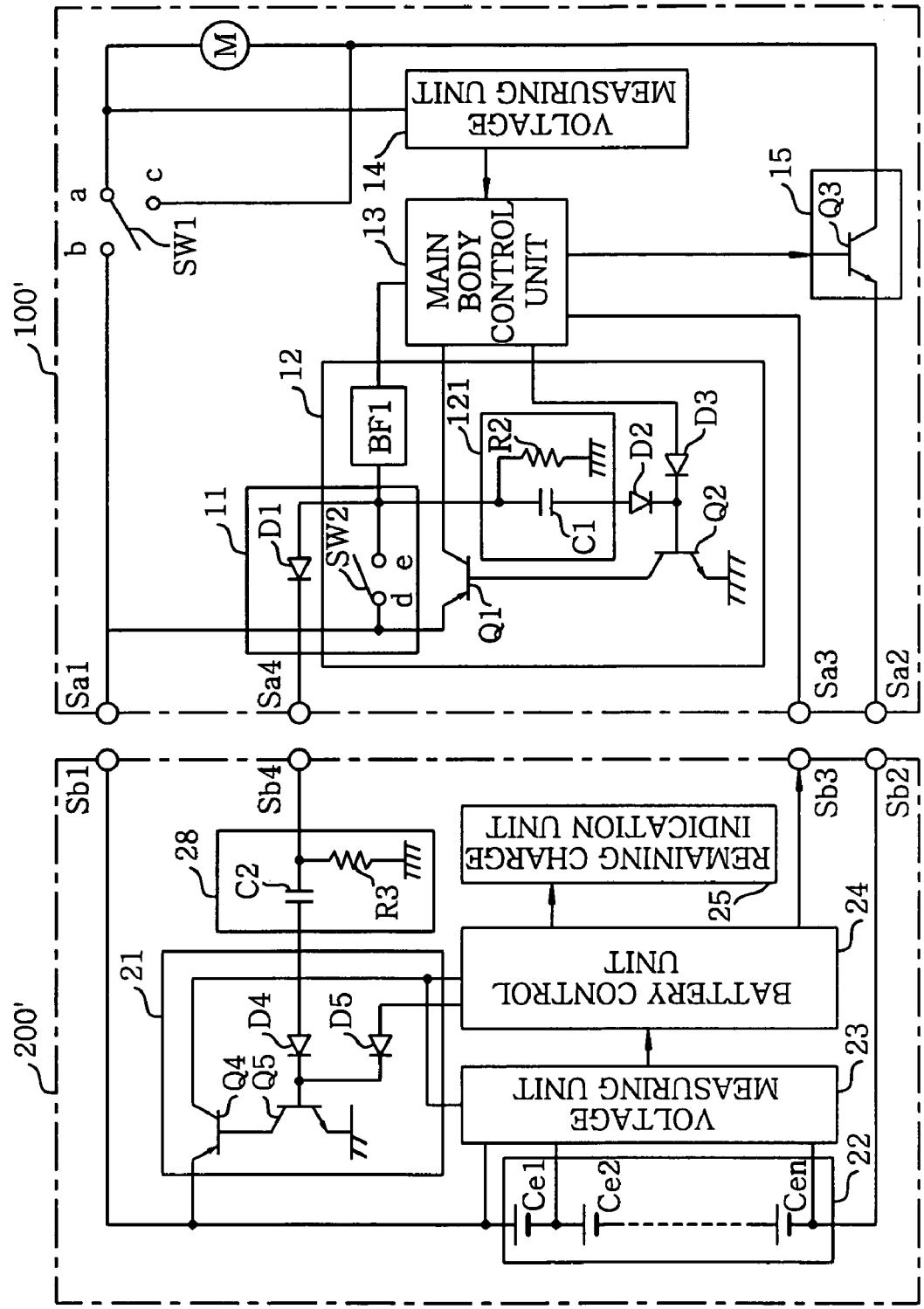
FIG. 9 illustrates a block diagram for showing an electric configuration of an power tool further including one-shot circuits in accordance with another preferred embodiment.

FIG. 9 illustrates a block diagram for showing an electric configuration of an power tool further including one-shot circuits in accordance with this embodiment. As shown therein, a tool main body 100' includes all the elements of the tool main body 100 shown in FIG. 4, and further includes a main body one-shot circuit 121 between the contact point e of the switch SW2 and the anode of the diode D2, wherein the main body one-shot circuit 121 has a capacitor C1 and a resistor element R2. That is, the contact point e of the switch SW2 is connected to the anode of the diode D2 via the capacitor C1, and to the ground via the resistor element R2. Since the other configuration of the tool main body 100' is same as that of the tool main body 100 shown in FIG. 4, the description thereof will be omitted. Further, a battery pack 200' includes all the elements of the battery pack 200 shown in FIG. 4, and further includes a battery one-shot circuit 28 between the battery signal electrode Sb4 and the anode of the diode D4, wherein the battery one-shot circuit 28 has a capacitor C2 and a resistor element R3. That is, the battery signal electrode Sb4 is connected to the anode of the diode D4 via the capacitor C2, and to the ground via the resistor element R3. Since the other configuration of the battery pack 200' is same as that of the battery pack 200 shown in FIG. 4, the description thereof will be omitted.

Figure 10:
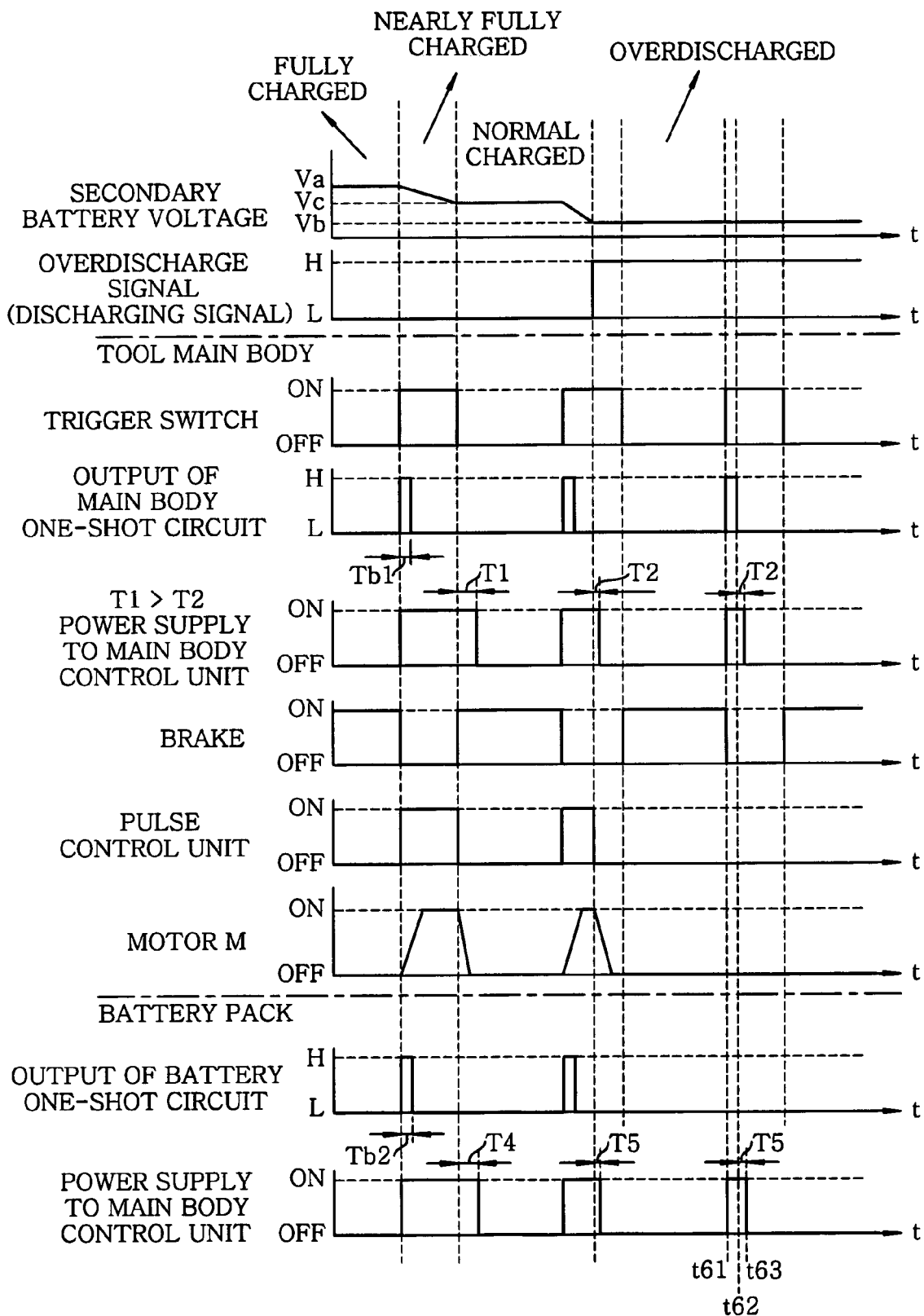
FIG. 10 provides a timing chart for describing the operation of the tool main body 100' and the battery pack 200' in accordance with said another preferred embodiment.

FIG. 10 provides a timing chart for describing the operation of the tool main body 100' and the battery pack 200' in accordance with this embodiment. In FIG. 10 are depicted the secondary battery voltage (i.e., the voltage difference between the two terminals of the secondary battery 22), the overdischarge signal (or the discharging signal), the operation of the trigger switch 112 in the tool main body 100', the output of the main body one-shot circuit 121, the power supply to the main body control unit 13, the operation of the brake, the operations of the pulse control unit 15 and motor M, the output of the battery one-shot circuit 28 in the battery pack 200', and the power supply to the battery control unit 24.

In a manner similar to the configuration shown in FIG. 1, if the battery pack 200' is attached to the tool main body 100', the power receiving electrodes Sa1 and Sa2 of the tool main body 100', and main body signal electrodes Sa3 and Sa4 are press-contacted to the power supplying electrodes Sb1 and Sb2 of the battery pack 200', and the battery signal electrodes Sb3 and Sb4, respectively. When the trigger switch 112 is manipulated by a user of the power tool, the switches SW1 and SW2 are switched on in response to the trigger switch 112. That is, the contact point a of the switch SW1 gets connected to the contact point b, and the contact point d of the switch SW2 gets connected to the contact point e. Thus, the on-manipulation signal is outputted to the main body signal electrode Sa4 via the diode D1 so that it can be outputted to the battery pack 200', and the starting signal is inputted to the main body control unit 13 via the buffer BF1. Thereafter, a single pulse voltage is applied to the diode D2 via the main body one-shot circuit 121, thereby sequentially turning on the transistors Q2 and Q1 to supply the electric power to the main body control unit 13 from the secondary battery 22 via the transistor Q1. Then, the main body control unit 13 is started to start the control of the tool main body 100', thereby performing a power supply self-sustaining control for sustaining the power supply from the power receiving electrode Sa1 via the transistor Q1.

Herein, the operation of the tool main body 100' further including the main body one-shot circuit 121 is different from that of the tool main body 100 in the previous embodiment in that, since a voltage is applied to the diode D2 via the main body one-shot circuit 121, a pulse-shaped voltage applied to the diode D2 has a pulse width same as a time constant Tb1 determined by the capacitor C1 and the resistor element R2 in the main body one-shot circuit 121. Therefore, in accordance with this embodiment, if the trigger switch 112 is switched on while the secondary battery 22 is in the overdischarged state (a timing t61 in FIG. 10, which corresponds to the timing t9 in FIG. 5), an output voltage of the main body one-shot circuit 121 rises to a high level, having a pulse shape, during only for a short while right after the trigger switch 121 is manipulated and then drops after a short period of time. Since the power supply to the main body control unit 13 is cut off (a timing t63 in FIG. 10, which corresponds to the timing t11 in FIG. 5) when a preset period of time T2 elapses from the time the output voltage of the main body one-shot circuit 121 drops to a low level (a timing t62 in FIG. 10), the power supply to the main body control unit 13 can be cut off in a shorter period of time than in the tool main body 100, which does not include the main body one-shot circuit 121. Therefore, a time interval between t61 and t63 is shorter than that between t9 and t11. In this manner, the discharge of the secondary battery 22 can be stopped immediately when the secondary battery 22 is in the overdischarged state, so that a performance deterioration of the secondary battery 22 can be prevented more efficiently.

Further, if the battery pack 200' is attached to the tool main body 100', and the user of the power tool manipulates the trigger switch 112 (a timing T21), the switches SW1 and SW2 are switched on in response to the manipulation of the trigger switch 112. Therefore, as described above, the on-manipulation signal is outputted from the main body signal electrode Sa4 via the diode D1 so that the on-manipulation signal is inputted to the battery signal electrode Sb4. As a result, the voltage applied to the power receiving electrode Sa1 is applied as a single pulse to the base of the transistor Q5 via the switch SW2, the diode D1, the main body signal electrode Sa4, the battery signal electrode Sb4, the battery one-shot circuit 28 and the diode D4. Thus, the transistor Q5 is turned on to thereby turn on the transistor Q4, so that an electric power is supplied to the voltage measuring unit 23 and the battery control unit 24 from the secondary battery 22 via the transistor Q4. Then, the battery control unit 24 is started to start a control operation for protecting the secondary battery 22. Further, the battery control unit 24 determines the state of the secondary battery 22, and based on the determined state of the secondary battery 22, the voltage control unit 24 controls a period of time for which a voltage is applied to the base of the transistor Q5 via the diode D5, thereby controlling a period of time for which an electric power is applied from the secondary battery 22.

Herein, the operation of the battery pack 200' further including the battery one-shot circuit 28 is different from that of the battery pack 200 in the previous embodiment in that, since a voltage is applied to the diode D4 via the battery one-shot circuit 28, a pulse-shaped voltage applied to the diode D4 has a pulse width of the pulse-shaped voltage same as a time constant Tb2 determined by the capacitor C2 and the resistor element R3 in the battery one-shot circuit 28. Therefore, in accordance with this embodiment, if the trigger switch 112 is switched on while the secondary battery 22 is in the overdischarged state (a timing t61 in FIG. 10, which corresponds to the timing t31 in FIG. 6), an output voltage of the battery one-shot circuit 28 rises to a high level, having a pulse shape, during only a short period of time right after the trigger switch 121 is manipulated and then drops after a short period of time. Since the power supply to the battery control unit 24 is cut off (a timing t63 in FIG. 10, which corresponds to the timing t33 in FIG. 6) when a preset period of time T5 elapses from the time the output voltage of the battery one-shot circuit 28 drops to a low level (a timing t62 in FIG. 10), the power supply to the battery control unit 24 can be cut off in a shorter period of time than in the battery pack 200, which does not include the battery one-shot circuit 28. Therefore, a time interval between t61 and t63 is shorter than that between t31 and t33. In this manner, the discharge of the secondary battery 22 can be stopped immediately when the secondary battery 22 is in the overdischarged state, so that a performance deterioration of the secondary battery 22 can be prevented more efficiently.

Further, although the trigger switch in the preferred embodiments described above is capable of changing a magnitude of an electric power in accordance with the magnitude of the manipulation as well as being switched on and off, the trigger switch in accordance with the present invention may also be configured such that it is merely capable of being switched on and off.

As described above, in accordance with the preferred embodiment, when the on-manipulation signal indicating the manipulation switch is manipulated is inputted from the main body, the supply of the power is started from the secondary battery to the battery control unit. Thus, since there is no idling current flowing, the performance deterioration of the secondary battery can be reduced compared to the prior art.

While the invention has been shown and described with respect to the preferred embodiments, it will be understood by those skilled in the art that various changes and modification may be made without departing from the scope of the invention as defined in the following claims.

What is claimed is:

1. An electrical apparatus comprising:
an electrical apparatus main body including:
  a load,
  a manipulation switch for operating the load,
  a power receiving electrode for receiving an electric power,
  a main body control unit for controlling the electric power supplied from the power receiving electrode to the load in response to a manipulation of the manipulation switch,
  a signal generation unit for generating an on-manipulation signal to indicate that the manipulation switch is switched on if the manipulation switch is switched on, and
  a main body signal electrode for outputting the on-manipulation signal generated by the signal generation unit; and
a battery pack including:
  a battery,
  a power supplying electrode for supplying an electric power from the battery to the power receiving electrode,
  a battery control unit for controlling the electric power supplied from the battery to the power supplying electrode to suppress a performance deterioration of the battery,
  a battery signal electrode for receiving the on-manipulation signal from the main body signal electrode, and
  a power supplying unit for starting a power supply from the battery to the battery control unit when the battery signal electrode receives the on-manipulation signal,
wherein the battery pack further includes:
a detection unit for detecting a state of the battery, and
wherein the signal generation unit further generates an off-manipulation signal to indicate that the manipulation switch is switched off if the manipulation switch is switched off,
the main body signal electrode further outputs the off-manipulation signal generated by the signal generation unit,
the battery signal electrode further receives the off-manipulation signal from the main body signal electrode, and
the battery control unit adjusts a period of time for which the electric power is supplied from the power supplying unit based on the state of the battery detected by the detection unit when the battery signal electrode receives the off-manipulation signal.

2. The electrical apparatus of claim 1, wherein, when the battery signal electrode receives the off-manipulation signal, the battery control unit allows an electric power to be supplied from the power supplying unit for a first period of time if the state of the battery detected by the detection unit is a first state, allows the electric power to be supplied from the power supplying unit for a second period of time that is shorter than the first period of time if the state of the battery detected by the detection unit is a second state in which an amount of a remaining charge is smaller than that in the first state, and allows the electric power to be supplied from the power supplying unit for a third period of time that is shorter than the second period of time if the state of the battery detected by the detection unit is a third state in which the amount of the remaining charge is smaller than that in the second state.

3. The electrical apparatus of claim 1, wherein the battery control unit outputs an overdischarge signal to the electrical apparatus main body to indicate that the state of the battery is an overdischarged state if the state of the battery detected by the detection unit is the overdischarged state, and
wherein, an overdischarge threshold level by which the overdischarged state is determined is set to be a lower level until a preset period of time elapses after the battery signal electrode receives the on-manipulation signal, and a higher level otherwise.

4. The electrical apparatus of claim 1, further comprising:
a memory unit for storing the state of the battery detected by the detection unit,
wherein the battery control unit has the memory unit store the state of the battery detected by the detection unit when the battery signal electrode receives the off-manipulation signal, and adjusts the period of time for which the electric power is supplied from the power supplying unit based on the state of the battery stored in the memory unit instead of the state of the battery detected by the detection unit.

5. The electrical apparatus of claim 1, wherein the on-manipulation signal is of a single pulse shape synchronous to the manipulation of the manipulation switch, and the battery control unit cuts off the power supply of the power supplying unit if the state of the battery detected by the detection unit is an overdischarged state.

6. The electrical apparatus of claim 1, further comprising:
a memory unit for storing the state of the battery detected by the detection unit,
wherein the battery control unit has the memory unit store the state of the battery as an overdischarged state when the state of the battery detected by the detection unit is the overdischarged state, and, when the battery signal electrode receives the on-manipulation signal and if the state of the battery stored in the memory unit is the overdischarged state, the battery control unit has the power supplying unit cut off the power supply.

7. The electrical apparatus of claim 1, further comprising:
a memory unit for storing the number of overdischarged states,
wherein the battery control unit counts the number of cases where the state of the battery detected by the detection unit is an overdischarged state to have the memory unit store the number of the cases as the number of the overdischarged states, and, when the battery signal electrode receives the on-manipulation signal and if the number of the overdischarged states stored in the memory unit is larger than or equal to a predetermined number, the battery control unit has the power supplying unit cut off the power supply.

8. The electrical apparatus of claim 1, wherein the battery is a lithium-ion battery.

9. The electrical apparatus of claim 1, wherein no idling current flows in the electrical apparatus if a time period elapses after the manipulation switch is switched off, the length of the time period being determined based on a charged state of the battery.

10. The electrical apparatus of claim 1, wherein the main body control unit, which receives a discharging signal or an overdischarge signal depending on a state of the battery from the battery control unit, allows the electric power to be supplied from the power receiving electrode to the load when the main body control unit receives the discharging signal, and stops the electric power being supplied from the power receiving electrode to the load when the main body control unit receives the overdischarge signal.

11. The electrical apparatus of claim 1, wherein the battery pack further includes a remaining charge indication unit that indicates an amount of a remaining charge of the battery.

12. The electrical apparatus of claim 1, wherein the state of the battery is one of a fully charge state, a nearly fully charge state, a normal charge state and an overdischarged state.

* * * * *

UNITED STATES PATENT AND TRADEMARK OFFICE
CERTIFICATE OF CORRECTION

PATENT NO.      : 7,612,525 B2         Page 1 of 1
APPLICATION NO. : 11/389211
DATED           : November 3, 2009
INVENTOR(S)     : Ito et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 407 days.

Signed and Sealed this

Nineteenth Day of October, 2010

David J. Kappos
*Director of the United States Patent and Trademark Office*